United States Patent
Kremsler et al.

(10) Patent No.: US 9,731,363 B2
(45) Date of Patent: Aug. 15, 2017

(54) CUTTING DEVICE FOR CUTTING A CYLINDRICAL WORKPIECE

(71) Applicant: Andreas Stihl AG & Co. AG, Waiblingen (DE)

(72) Inventors: Dieter Kremsler, Spiegelberg (DE); Juergen Hohl, Waiblingen (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 0 days.

(21) Appl. No.: 15/017,473

(22) Filed: Feb. 5, 2016

(65) Prior Publication Data
US 2016/0228960 A1    Aug. 11, 2016

(30) Foreign Application Priority Data
Feb. 5, 2015 (DE) .......................... 10 2015 001 453

(51) Int. Cl.
*B23D 45/12* (2006.01)
*B26D 7/00* (2006.01)
*B26D 3/16* (2006.01)

(52) U.S. Cl.
CPC ............. *B23D 45/126* (2013.01); *B26D 3/16* (2013.01); *B26D 7/0006* (2013.01)

(58) Field of Classification Search
CPC .... B23D 45/126; B23D 21/04; B23D 45/125; B23D 3/167; B26D 3/16; B26D 7/0006; Y10T 83/674; Y10T 83/667; F16L 41/06
USPC ......... 83/769, 744, 745; 30/91, 92, 92.2, 93, 30/94, 95, 96, 97, 98, 99, 101, 102, 108, 30/294, 289, 347; 82/70.2, 46, 4.3, 101, 82/72, 100, 47; 269/1, 2
See application file for complete search history.

(56) References Cited

U.S. PATENT DOCUMENTS

| 2,291,395 A | * | 7/1942 | Levey | B23D 45/126 266/56 |
| 2,364,963 A | * | 12/1944 | Elliott | B23K 7/006 266/56 |
| 3,555,239 A | * | 1/1971 | Kerth | G05B 19/188 219/121.63 |
| 3,688,615 A | * | 9/1972 | Protze | B23D 45/126 125/14 |
| 3,704,516 A | | 12/1972 | Ono | |

(Continued)

FOREIGN PATENT DOCUMENTS

JP    61-209816 A    9/1986

*Primary Examiner* — Ghassem Alie
(74) *Attorney, Agent, or Firm* — Walter Ottesen, P.A.

(57) ABSTRACT

A guide carriage for a cutting device for cutting a cylindrical workpiece. The carriage has a tool carrier for the cutting device and a tensioning member which wraps around the workpiece and is guided over a tensioning element. A tensioning device disposed on a chassis acts on the tensioning element. The tensioning device exerts a tensioning force on the tensioning member via the tensioning element. The tensioning member, a belt, is secured non-displaceably on the periphery of the workpiece. The chassis is movable in the peripheral direction of the workpiece along the belt. The belt bears a connecting element, by which the belt is closed. The connecting element is not fully traversable by the guide carriage. In order to be able to execute a full cut over the periphery, the tool carrier enables the cutting device to be mounted in a first and alternatively a second working position.

15 Claims, 8 Drawing Sheets

(56) References Cited

U.S. PATENT DOCUMENTS 4,757,977 A * 7/1988 Krieg ................. B23K 37/0217
  266/56
5,081,768 A * 1/1992 Brennan ................ B23D 21/04
  30/101

* cited by examiner

CUTTING DEVICE FOR CUTTING A CYLINDRICAL WORKPIECE

CROSS REFERENCE TO RELATED APPLICATION

This application claims priority of German patent application no. 10 2015 001 453.6, filed Feb. 5, 2015, the entire content of which is incorporated herein by reference.

BACKGROUND OF THE INVENTION

A guide carriage having a cutting device for cutting or cutting through a cylindrical workpiece is known from U.S. Pat. No. 2,291,395. This guide carriage has a tool carrier for a cutting tool and includes a tension chain which wraps around the workpiece and is guided over tensioning elements. Acting on the tensioning elements is a tensioning arrangement, which is provided on the chassis of the guide carriage. This tensioning arrangement acts via the tensioning element on the tension chain and secures the latter against generated operating forces such that it is non-displaceable on the periphery of the workpiece. The chassis is moveable in the peripheral direction of the workpiece along the tension chain.

The tension chain is of endless configuration, so that the guide carriage is transportable over the whole of the periphery of the workpiece. This presupposes, however, that the tension chain can be slipped over an axial end of the workpiece in order to be positioned on the workpiece.

In applications in which a concrete pipe to be cut is buried in the earth and no end is exposed, the guide carriage, in the absence of mounting options for the tension chain over an axial end of the concrete pipe, cannot be fixed securely on the pipe. This applies also to tall vertical columns, in which, though the free end is present, it is poorly accessible.

SUMMARY OF THE INVENTION

It is an object of the invention to provide a guide carriage for a cutting device for cutting through a cylindrical workpiece, which guide carriage can be securely mounted and held in place even if the axial ends of the workpiece are inaccessible.

According to the invention, the tensioning member is configured as an open belt, that is, the belt has a first belt end and a second belt end. It is provided that the belt bears a connecting element, by which the belt can be closed. This configuration of an open belt affords the user a secure mounting of the guide carriage on the outer periphery of the workpiece, even in respect of buried concrete pipes or high vertical columns. The concrete pipe has merely to be excavated over its periphery; the axial ends of the concrete pipe do not have to be accessible. A belt end is then pushed through under the concrete pipe and connected to the other belt end by the connecting element. In the case of the tall column, the guide carriage can be secured at the working height. The closed belt can be secured via the tensioning device immovably on the periphery of the workpiece against generated operating forces.

The belt can be a flexible belt having an inner structure including pull threads, running in the direction of pull of the belt, or a weave structure. The pull threads or the weave structure of the belt can be embedded in an elastic material. The pull threads running in the longitudinal direction of the belt can be made of plastic or of metal. Expediently, the belt is a flat belt. By the employed term "belt" are meant, in the broader sense, also pull members which are made of metal members and form a type of metal link chain, wherein the individual metal links are movable relative to one another, for instance are connected to one another by bolts or shafts.

The connecting element of the closed belt is non-traversable by the guide carriage. In order however order, however, to be able to approach every portion of the tool periphery with the cutting device, it is provided to secure the cutting device in a transposable manner on the workpiece carrier. The cutting device can be secured in two working positions on the workpiece carrier. A second working position of the cutting device here corresponds to a first working position, rotated through 180° about a vertical axis, of the cutting device. Thus, for the execution of a full cut over the periphery of the workpiece, for instance, the cutting device can be transposed on the workpiece carrier from a first working position into a second working position.

The cutting device has a cutting tool, which engages in the cutting joint. In order that, when the cutting device is transposed, the cutting tool lies oriented relative to the cutting joint, it is provided that the cutting tool, in one working position, possesses a second distance to the guide carriage. The first distance is here chosen equal in size to the second distance.

With the inventive guide carriage having a cutting device, cylindrical workpieces of different diameters can be cut. The workpiece can be made of concrete with or without reinforcement, of plastic, of a material composite or of another material. The workpiece can be a pipe, or perhaps a post, a pillar or the like. The belt which is to be closed via the connecting element ensures in a simple manner an adaptation to different diameters of the workpiece.

In one embodiment of the invention, the tensioning member is a toothed belt having a toothed belt side; this toothed belt side expediently lies facing the workpiece periphery. The toothing of the belt has the advantage that the belt can be secured in the connecting element in the direction of pull with a positive connection. Furthermore, the toothed belt side resting on the workpiece periphery has the advantage that, even in the event of soilings of the workpiece periphery, the toothing leads to a secure support on the workpiece periphery.

The tool carrier for the cutting device is advantageously provided on the chassis of the guide carriage. The cutting device can also be utilized separately from the guide carriage. The guide carriage must then only be mounted on the periphery of the workpiece if this is necessary for a circumferential cut with the cutting device.

The tensioning element is advantageously a tension pulley held on a bearing shaft, wherein the bearing shaft is part of the tensioning device and is moved into a tensioning position, together with the tension pulley, by the application of force. The bearing shaft of the tension pulley is here expediently configured such that it protrudes over the frame of the chassis. The overhanging free end of the protruding bearing shaft advantageously forms the tool carrier.

The bearing shaft is held between rocker arms of a rocker which is part of the tensioning device. The rocker is biased into a tensioning position. Expediently, the rocker is moved by force by a compression member into the tensioning position. The compression member is in particular a spring, wherein a helical spring is particularly suitable. The compression member advantageously acts on one end of the rocker, wherein the tensioning roller is provided between the end of the rocker and a pivot axis of the rocker.

In order to adjust or totally eliminate the bias of the rocker into the tensioning position, for the slackening of the tensioning device the compressive force can be altered via a control element. The control element is preferably a threaded rod.

In a refinement of the connecting element, this is configured as a belt lock or fastener. The belt lock is advantageously configured such that the belt lock has a first lock plate and a second lock plate. Both lock plates are fastened to a common lock carrier. The first belt end is fixed in a first fastening portion between the first lock plate and the lock carrier. The second belt end rests in a second fastening portion with its toothed belt side on the second lock plate. The lock plates advantageously have a toothing, wherein the toothing of the second lock plate lies facing a clamping lever. The fastening portions or the belt ends with which the belt is held in the belt lock, as well as the associated lock plates, intermesh positively, at least in the plane of the belt, via a toothing. Thus the first belt portion is positively interlocked with the first lock plate, and the second belt end or a second belt portion is interlocked with the second lock plate. The second belt end laid onto the second lock plate is held securely between the clamping lever and the second lock plate. The clamping lever secures the positive engagement of the toothed belt side with the toothing of the lock plate, so that no tensile forces in the peripheral direction of the belt have to be absorbed by the clamping lever itself. It can be expedient to apply a small clamping force to the belt via the clamping lever.

The clamping lever of the belt lock is expediently held pivotably in or on the lock carrier. The clamping lever has a release position and a clamping position. In the release position, the clamping lever releases the belt; in the clamping position, the clamping lever secures the belt in the belt lock.

In order to securely avoid unintentional opening of the belt lock, it is provided to secure the clamping lever in its clamping position mechanically against an opening force.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
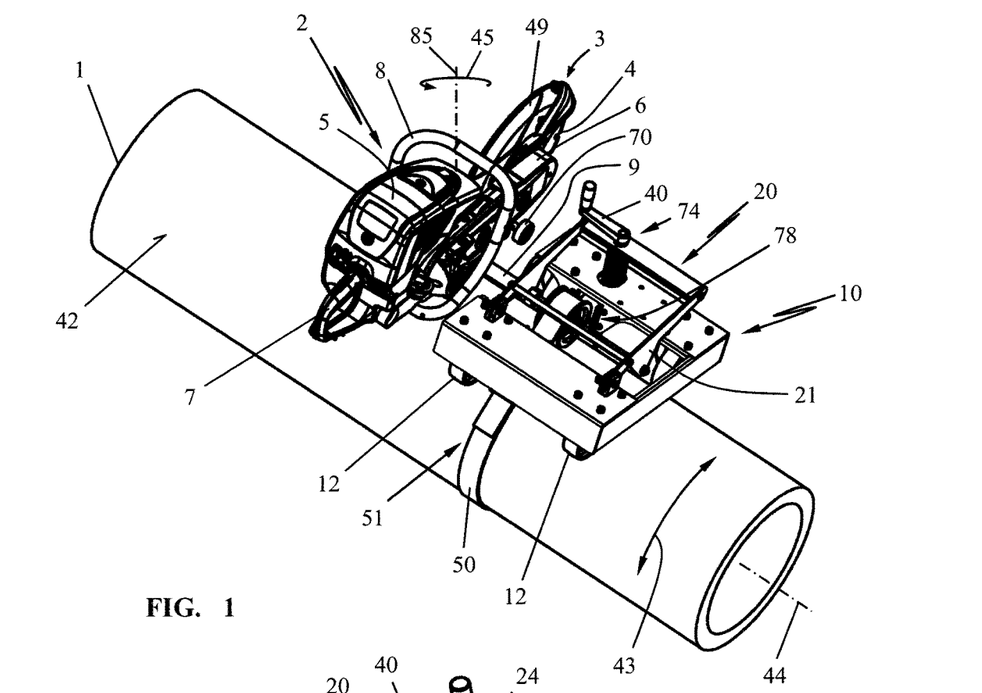
FIG. 1 shows in perspective representation a cutting device, mounted on a cylindrical workpiece, with a guide carriage.
Figure 2:
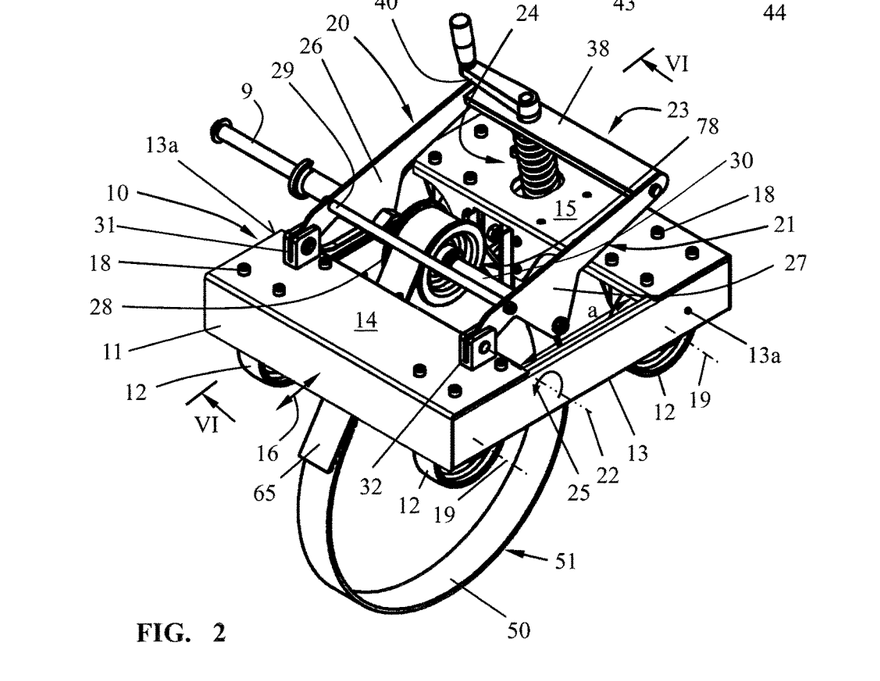
FIG. 2 shows in a perspective representation the guide carriage according to FIG. 1 in isolation.
Figure 3:
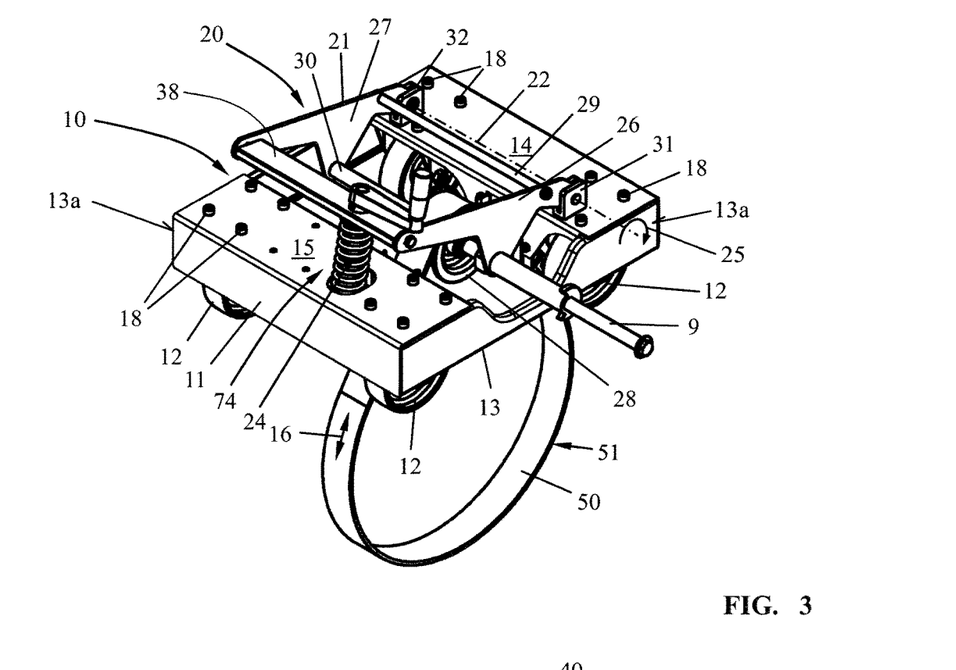
FIG. 3 shows the guide carriage according to FIG. 2 in a perspective representation rotated through 180°.

FIG. 1 shows a cylindrical workpiece 1 which is intended to be cut through or cut in the peripheral direction 43 with a cutting device 2. To this end, as shown, in particular, also by FIG. 9, a cutting tool 3 is provided, in the illustrative embodiment a cutting disc 4. In the shown illustrative embodiment, the cutting device 2 is an angle grinder 5, on whose cross arm 6 the cutting disc 4 is held and rotatingly driven. The angle grinder 5 can have a two-stroke motor, four-stroke motor, or perhaps an electric motor, as the drive motor.

In the shown illustrative embodiment, the angle grinder has a rear handle 7 and a front bow-shaped handle 8, which latter lies facing the cutting tool 3. The cutting device 2 is held on a tool carrier 9 of a guide carriage 10.

The guide carriage 10 is represented in detail in FIGS. 2 to 11. It includes a chassis 11 having running wheels 12. The chassis 11 is constructed substantially as a rectangular frame 13, on whose top side are secured two narrow supporting plates (14, 15). The supporting plates 14 and 15 lie at a distance a apart in the direction of travel 16 of the guide carriage 10. Wheel holders 17 are arranged on supporting plates 14 and 15 secured on the frame 13; in the shown illustrative embodiment, the wheel holders 17 are fastened with fastening screws 18 to the supporting plates 14 and 15. On each supporting plate (14, 15), two running wheels 12 are mounted via wheel holders 17, wherein the running wheels 12 of a supporting plate (14, 15) rotate about a common rotational axis 19. The running wheels 12 lie directly adjacent to the outer frame carriers 13a of the frame 13, which extend in the direction of travel 16. The supporting plates 14 and 15 of the guide carriage 10 further hold a rocker 21 of a tensioning device 20. The rocker 21 is held on one supporting plate 14 pivotably about a pivot axis 22; at the other end 23 of the rocker 21, a compression member 24, which moves the rocker 21 by force in the direction of the rotation arrow 25, acts on a transverse strut 38. The compression member 24 is adjustable, for adjustment of the compressive force, via a control element 74.

By rocker arms 26 and 27 of the rocker 21, a bearing shaft 30 is held. Between the rocker arms 26 and 27, a tensioning element 78 is disposed on the bearing shaft 30. In the illustrative embodiment, the tensioning element 78 is realized as a tension pulley 28, which is mounted rotatably on the bearing shaft 30. The tensioning element 78 lies, in top view of the guide carriage 10, close to the center of the chassis 11. The tensioning element 78 here lies closer to the cutting tool 3 or to a cutting joint 75 or kerf made in the workpiece by the cutting tool 3 (FIG. 9) than to the frame carrier 13a, facing away from the cutting joint 75, of the frame 13. The chassis 11 itself has running wheels 12—in top view of the guide carriage 10—on both axial sides of the tensioning element 78.

For the stiffening of the U-shaped rocker 21, a stiffening strut 29 is provided between the ends of the rocker arms 26 and 27, close to the pivot axis 22. The free ends of the rocker arms 26 and 27 are held in bearing pedestals 31 and 32, which define the pivot axis 22.

Figure 4:
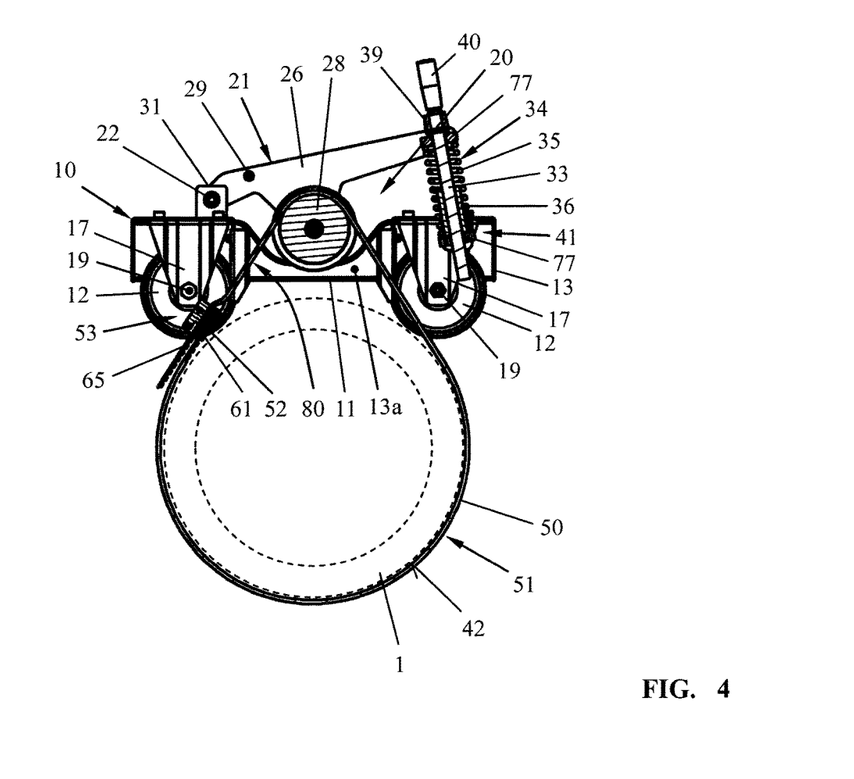
FIG. 4 shows a section through the guide carriage along the line IV-IV in FIG. 2.
Figures 5, 6:
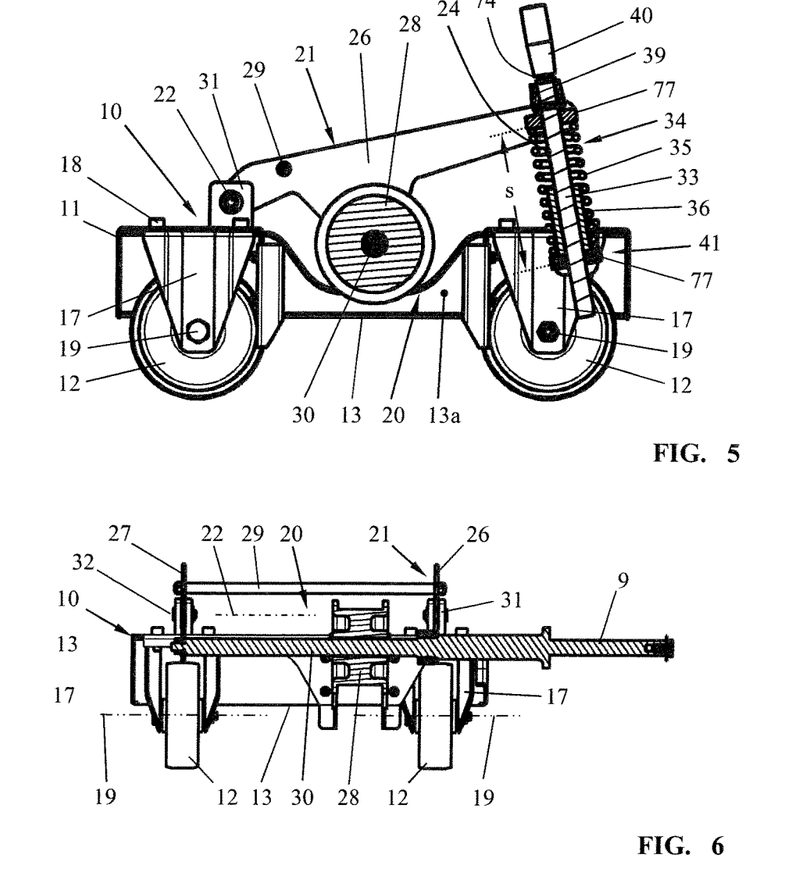
FIG. 5 shows in enlarged representation the section according to FIG. 4 without tensioning member.
FIG. 6 shows a schematic section through the guide carriage without tensioning member along the bearing shaft of a tension pulley.
Figure 7:
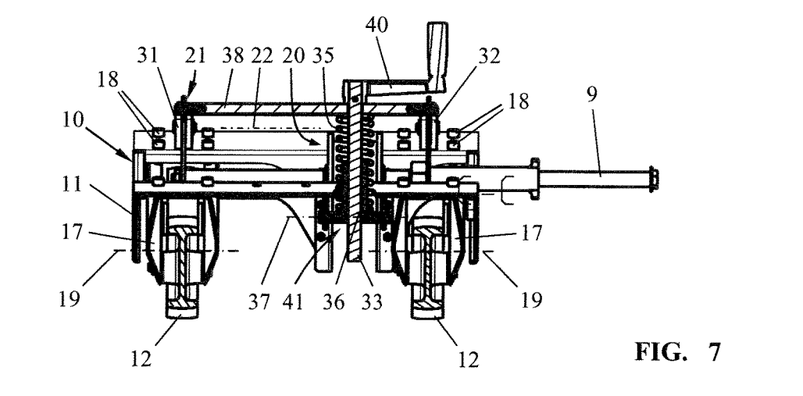
FIG. 7 shows a schematic section through the guide carriage at the level of the tensioning device.

The compression member 24 of the tensioning device 20 is represented in detail in FIGS. 4, 5 and 7. It includes a threaded rod 33 and a spring 34, which in the shown illustrative embodiment is configured as a helical spring 35. The threaded rod is screwed into a threaded bushing 36, which is secured within the frame 13 to the supporting plate 15 via a pivot bearing 41. FIG. 7 shows that the threaded rod 33 is held on the supporting plate 15, wherein the threaded rod 33 is pivotable by a pivot bearing 41 about an adjusting axis 37 (FIG. 7). The adjusting axis 37 ensures a positional orientation of the threaded rod 33 relative to the pivot position of the rocker 21 about the pivot axis 22.

The compression member 24 is supported against the transverse strut 38 of the rocker 21, whereby the rocker 21 is subjected to force in the direction of the rotation arrow 25 and thus moves the tension pulley 28, which is held on the bearing shaft 30, by force in the tensioning direction. In the illustrative embodiment, the compression member 24 is formed by a spring, in particular the helical spring 35. The threaded rod 33 projects through the helical spring 35, wherein the helical spring 35 is held at its ends in support bearings 77 (FIGS. 4, 5). One support bearing 77 lies between the helical spring 35 and the transverse strut 38 of the rocker 21; the other support bearing 77 forms a part of the pivot bearing 41 and diverts the spring force into the frame 13 of the guide carriage 10. The free end of the threaded rod 33 projects through the transverse strut 38 and is supported on the transverse strut 38 via a thrust bearing 39; on the free end is mounted a crank 40, which is connected in a rotationally secure manner to the threaded rod 33.

The other end of the threaded rod 33 engages in a threaded bore of the support bearing 77 in the pivot bearing 41 and projects through this. By rotation of the crank 40, the threaded rod 33 is screwed into the lower support bearing 77 or unscrewed, whereby the distance s between the support bearings 77 can be altered.

By rotation of the threaded rod 33, the compression member 24, in the illustrative embodiment the helical spring 35, is compressed and the rocker 21 moved counter to the rotation arrow 25 about the pivot axis 22. The tensioning force applied by the tensioning element 78 or the tension pulley 28 to a tensioning member 51 is reduced or totally removed. The compression member 24 is here supported in the region of the support bearing 77 or of the threaded bushing 36 against the pivot bearing 41. The compression member 24, in the illustrative embodiment the helical spring 35, acts between the pivot bearing 41, which lies secured on the chassis 11, and the transverse strut 38 of the rocker 21.

For the mounting of the cutting device 2 on the guide carriage 10 there is provided the tool carrier 9, which advantageously is an extension of the bearing shaft 30 of the tensioning element 78. This is clear, in particular, from the section in FIG. 6. The bearing shaft 30 is configured extended at one end and projects laterally beyond the frame 13 of the chassis 11.

As represented in FIG. 1 and portrayed schematically in section in FIG. 4, the guide carriage 10 is held, for example non-positively, on the cylindrical workpiece 1 via a tensioning member 51 formed by a belt 50. The belt 50 is an open belt. The belt 50 has a first belt end 61 and a second belt end 65. The length of the belt 50 is greater than the outer periphery, measured in the peripheral direction 43, of the workpiece 1, in the illustrative embodiment a pipe, for example a concrete pipe, as is used in water and waste water systems.

For the mounting of the tensioning member 51 or belt 50 on the cylindrical workpiece 1, the open belt 50 can be stuck through under the workpiece 1 in order to place the belt 50 around the workpiece periphery 42. The belt 50 is here guided in such a way over the tension pulley 28 that the tension pulley 28 lies within the closed belt 50. The tension pulley 28 lies between the belt 50 and the workpiece periphery 42. The tension pulley 28 acts as the tensioning element 78 of the tensioning device 20. The belt 50 which has been laid onto the workpiece periphery 42 and guided over the tension pulley 28 is closed via the belt lock 52. Advantageously, the belt 50 can be tightened in hand-tight manner by the user. Expediently, the belt ends 61 and 65 overlap; the belt lock 52 acts between the overlapping belt portions and closes the open belt 50.

Following the tightening of the belt 50 on the workpiece periphery 42, the crank 40 is turned in order that the compressive force of the compression member 24, in the illustrative embodiment the spring 34, can act on the rocker 21. The threaded rod 33 is hereupon unscrewed from the threaded bushing 36 or the lower support bearing 77 to the point where the thrust bearing 39 lifts off from the transverse strut 38 of the rocker 21, since the belt 50 running over the tension pulley 28 permits no further shifting of the rocker 21 in the direction of the rotation arrow 25. The whole of the force of the compression member 24 now acts on the rocker 21, and thus as tensioning force on the belt 50. The belt 50 is secured non-positively on the workpiece periphery 42. As a result of the tensioning force, the running wheels 12 are pressed firmly against the workpiece periphery 42, so that slippage of the guide carriage 10 in the direction of the longitudinal axis 44 of the workpiece 1 is avoided. The guide carriage 10 is secured non-displaceably on the workpiece 1 in the direction of the longitudinal axis 44 of the workpiece 1 against generated operating forces; in the longitudinal direction of the belt 50, on the other hand, the guide carriage 10 is transportable in the direction of travel 16. In this way, the pipe can be cut through or cut in the peripheral direction with the cutting device 2 or the cutting tool 3. Traversing of the connecting element 53, in the illustrative embodiment the belt lock 52, is here impossible. In order to be able to execute a full cut over the periphery, however, the cutting device 2 is transposable on the tool carrier 9. The cutting device 2 can thus be mounted on the same guide carriage 10—and without detaching the guide carriage 10 from the workpiece 1—into a position rotated through 180° about a vertical axis 85, as indicated schematically in FIG. 1 by the rotation arrow 45. If the guide carriage 10 approaches the connecting element or the belt lock 52 in the course of a circumferential cut, the user will pull the cutting device 2 off the workpiece carrier 9 and put it back on rotated through 180° about the vertical axis 85, whereby the whole of the workpiece periphery can be cut by the cutting tool 3 without the belt lock 52 having to be traversed by the guide carriage 10. The vertical axis 85 stands perpendicular, in particular parallel to the plane of the cutting disc 4 and expediently lies orthogonally to the longitudinal axis of the cross arm 6 and/or to the longitudinal axis 44 of the workpiece 1.

Figure 12:
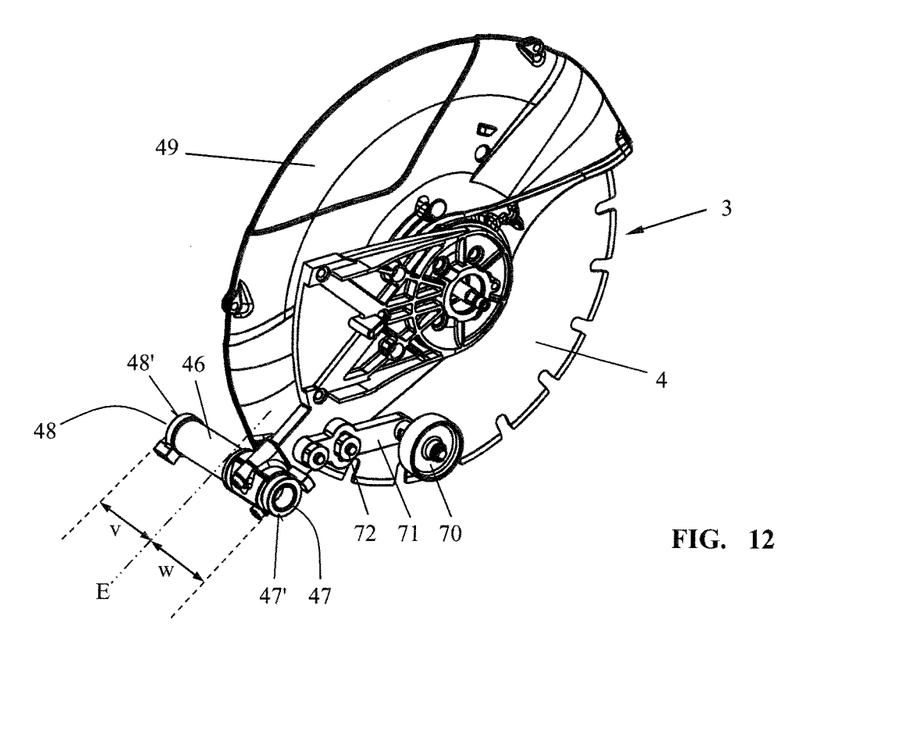
FIG. 12 shows in enlarged representation the cutting tool of the cutting device with protective hood.

The receiving fixture for the tool carrier is represented in FIG. 12. The receiving fixture is provided on the cutting device. The receiving fixture includes a socket 46, which is open at both ends (47, 48). The socket 46 is secured on the protective hood 49 of the cutting device 2, preferably in one piece therewith. The arrangement is here configured such that the socket 46 is divided in the middle by the cutting tool 3, in the illustrative embodiment the cutting disc 4. The end face 47' of the end 47 of the socket 46 lies at a distance (w) to the plane E of the cutting tool 3 or of the cutting disc 4; the end face 48' of the end 48 of the socket 46 lies at a distance (v) to the plane E of the cutting tool 3 or of the cutting disc 4. The distance (v) corresponds to the distance (w). In a first working position according to FIG. 1, the end face 47' bears against a contact surface 9' of the tool carrier. The plane E of the cutting disc 4 thus lies at a distance w to the contact surface 9'.

If the working position is changed, that is, the angle grinder rotated about the vertical axis 85, the tool carrier 9 is inserted into the other end 48 of the socket 46, whereupon the end face 48' comes to bear against the contact surface 9' of the tool carrier 9. In this working position rotated through 180°, the cutting disc 4 lies at the distance v to the contact surface 9'. Since the distance (v) is chosen equal in size to the distance (w), the cutting disc 4—regardless of the chosen working position on the workpiece carrier 98—lies always at a same distance to the contact surface 9'. The cutting tool 3, in the illustrative embodiment the cutting disc 4, will therefore always work in a same cutting joint 75; the position of the cutting tool 3 relative to the cutting joint 75 is not changed by the transposition of the cutting device on the tool carrier 9. A misalignment of the cutting tool 3 relative to the cutting joint 75 is avoided.

In order to limit the cutting depth of the cutting tool 3, on the protective hood 49 a castor 70 can be provided on an adjustable lever 71. The lever 71—following release of a fastening screw 72—is adjustable as the adjusting lever, whereby the cutting depth of the cutting disc 4 can be adjusted. The castor 70 is supported on the workpiece periphery 42. Alternatively, the castor 70 can also be configured as a runner or the like.

Figure 11:
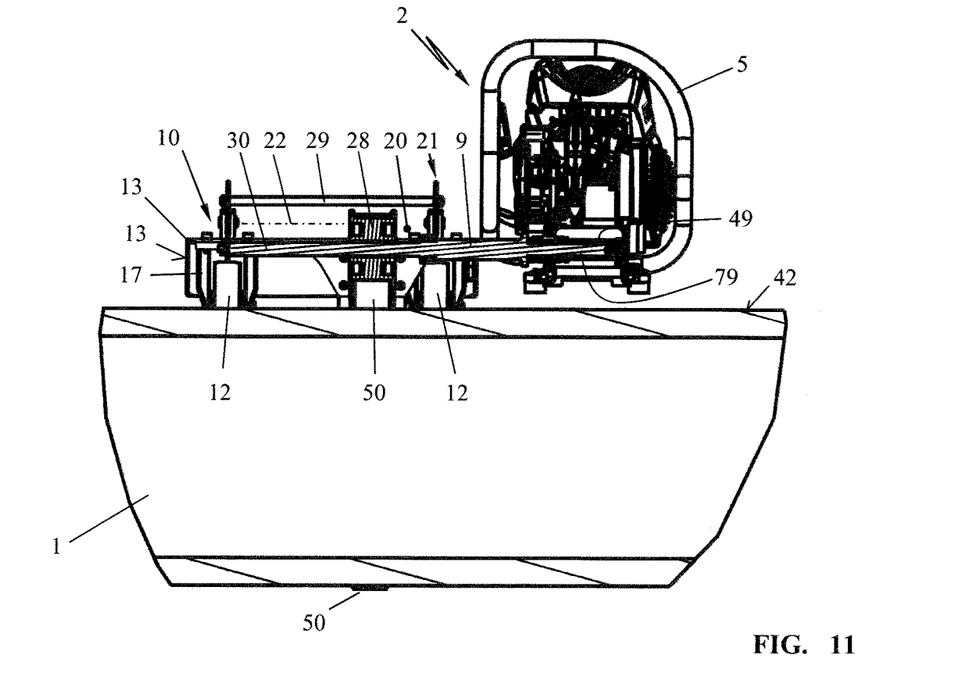
FIG. 11 shows a schematic axial section through the workpiece and the mounted guide carriage at the level of the bearing shaft of a tensioning device.

As can be seen from FIG. 11, the free end 79 of the tool carrier 9 engages in the socket 46 and is fixed therein. The socket 46 is open at both ends (47, 48). The free end 79 of the tool carrier 9 can be inserted both into one end 47 and into the other end 48, whereby a first working position and a second working position, rotated through 180°, of the cutting device 2 is obtained on the tool carrier 9 on the guide carriage 10.

Figure 8:
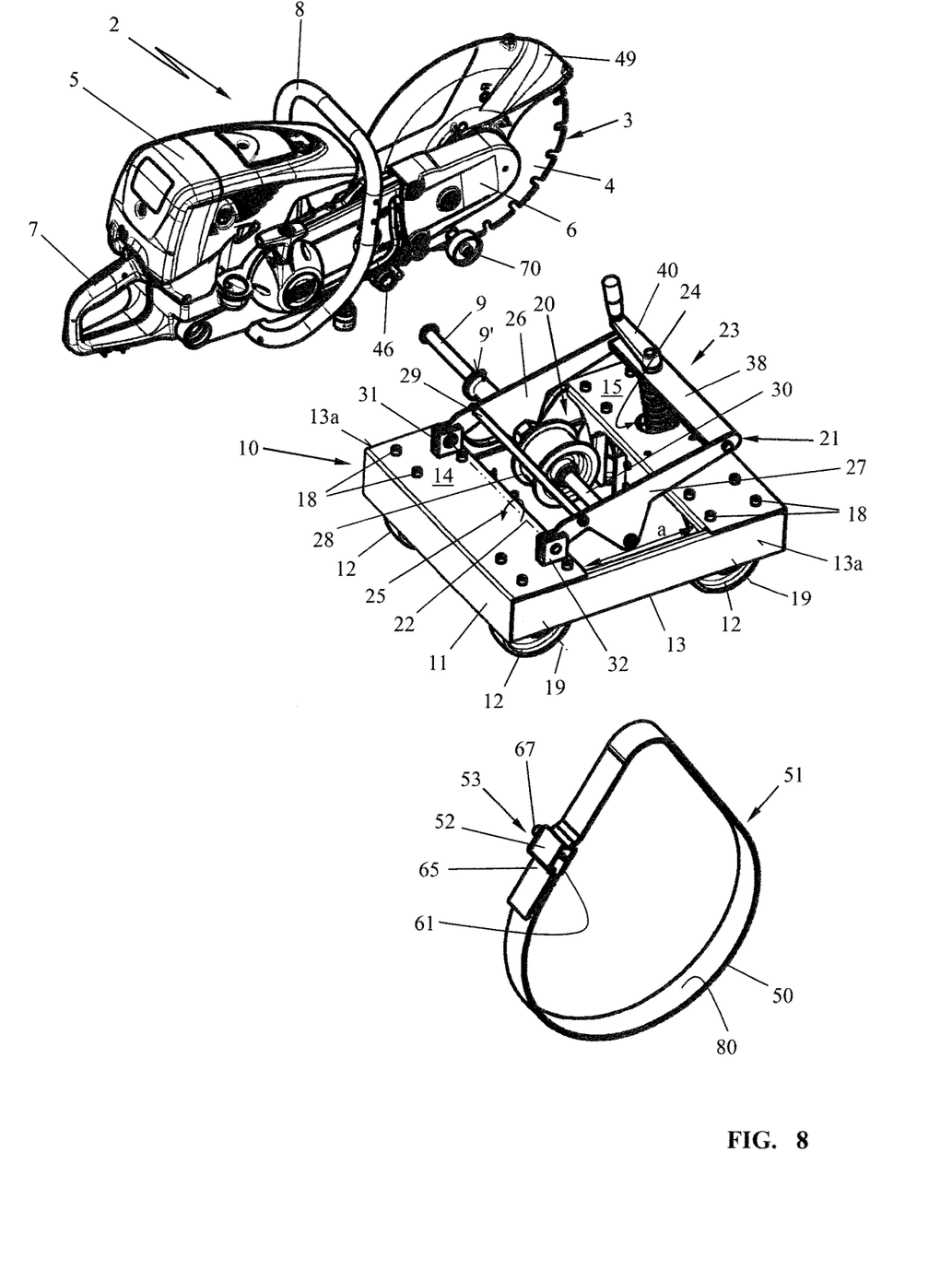
FIG. 8 is a perspective representation of the guide carriage, of the tensioning member and of the cutting device.
Figure 13:
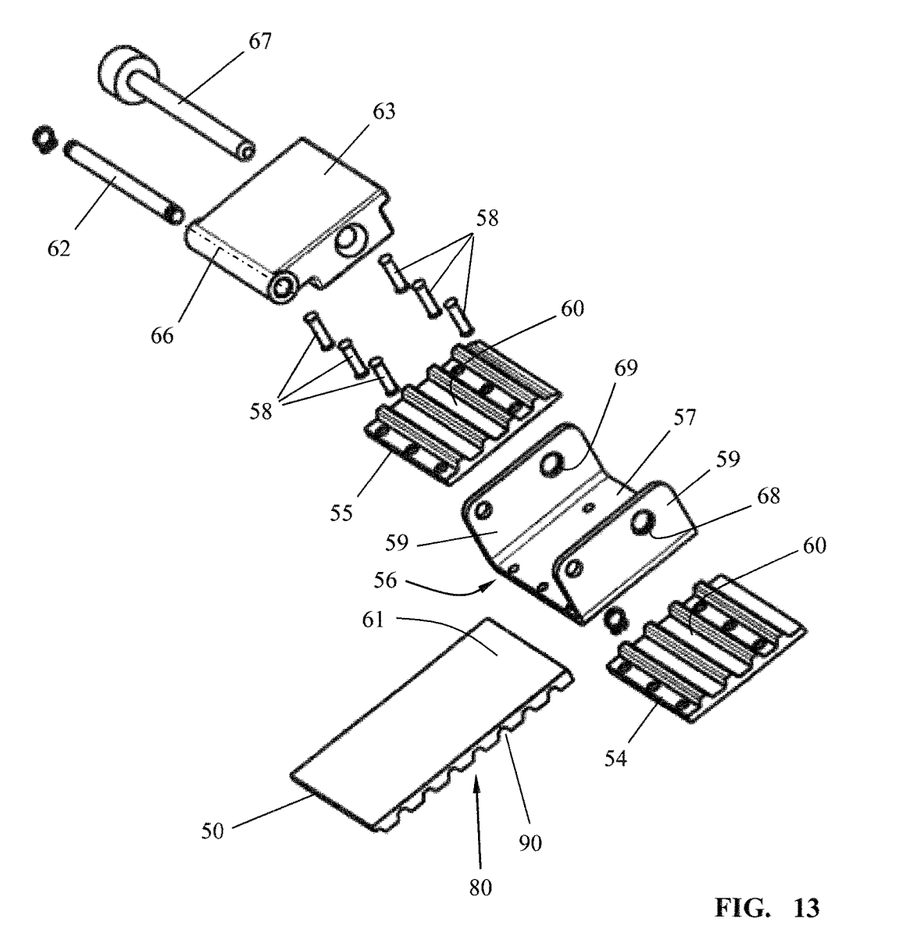
FIG. 13 shows in exploded representation the structure of the belt lock.
Figure 14:
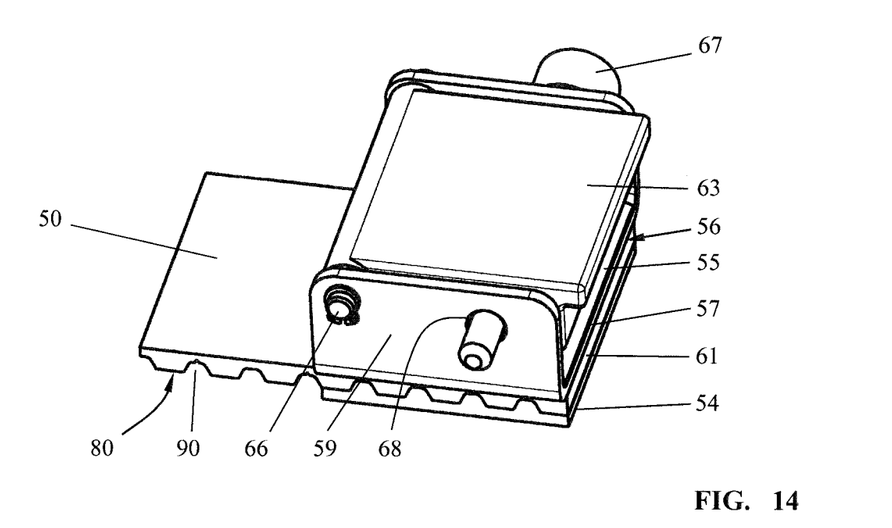
FIG. 14 is a perspective representation of a belt lock mounted on the end of a tensioning belt.

The belt 50 closed via the belt lock 52 is represented in FIG. 8. The belt lock 52—as shown by FIG. 13—includes a first lock plate 54 and a second lock plate 55, which are held on a common lock carrier 56. The lock plates 54 and 55 are configured with a toothing 60. The belt 50—as is shown in FIG. 13—also has a toothing 90. In its construction, the belt 50 corresponds to a toothed flat belt. The belt 50 is a flexible belt, which is configured rigidly in the transverse direction; a flat belt has this quality. The belt 50 has an inner construction, which includes pull threads, running in the direction of pull of the belt 50, or a weave structure. The pull threads or the weave structure of the belt 50 are embedded in an elastic material. The pull threads running in the longitudinal direction of the belt 50 can be made of plastic, or perhaps of metal.

Also a metal-link chain can be used as a belt within the meaning of the application. The term belt is intended to embrace, in general terms, pull members, thus also chains and/or belts, made of metal links. In link chains of this type, the individual chain links are movable relative to one another and are connected to one another, for instance, by bolts or shafts. As the material, metal can be used just as well as plastic and the like.

Figure 15:
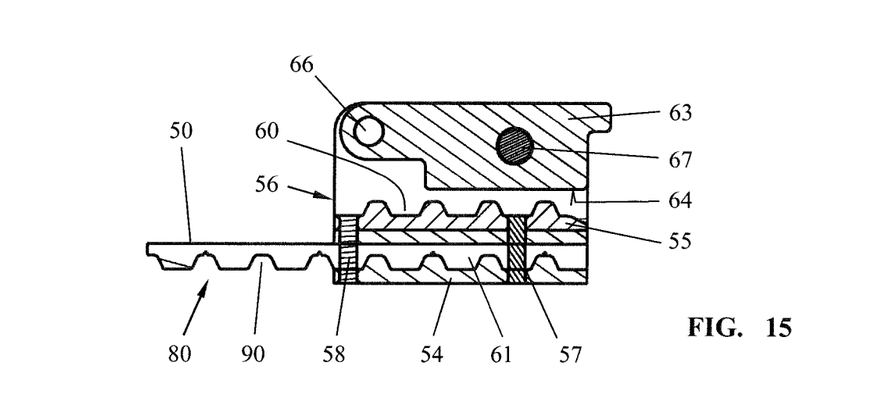
FIG. 15 shows a longitudinal section through the belt lock according to FIG. 14; and, FIG. 16 shows a cross section through the belt lock at the level of the locking bolt for the clamping lever.
Figure 16:
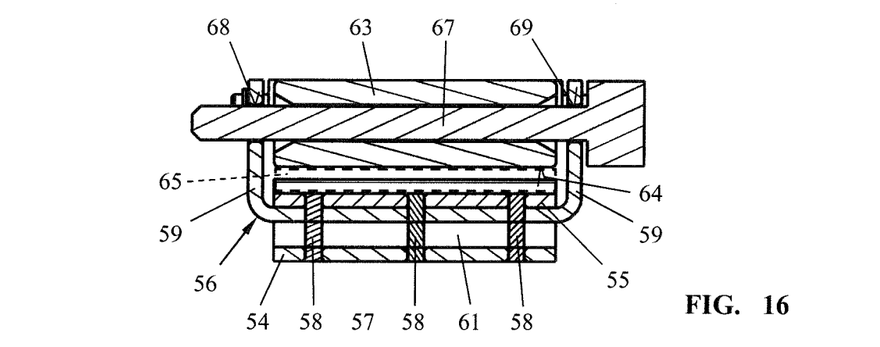

The belt end 61 shown in FIG. 13 is laid with its toothing 90 onto the toothing 60 of the first lock plate 54 and placed onto the smooth side of the belt 50 of the lock carriers 56. Within the—in cross section U-shaped—lock carrier 56 lies the second lock plate 55, whose toothing 60 lies facing away from the base 57 of the lock carrier 56. This construction—as shown by FIGS. 15 and 16—is joined together in a permanently fixed manner, for example by rivets 58. Thus a first fastening portion of the first lock plate 54 with the base 57 of the lock carrier 56 is obtained. A second fastening portion is configured between the second lock plate 55 and the base 57 of the lock carrier 56. Both fastening portions are fixed via the common rivets 58.

In the side arms 59 of the lock carrier 56, a clamping lever 63 is pivotably held via a bearing pin 62. The toothing 60 of the second lock plate 55 lies facing a clamping lever 63. The clamping lever 63 has a pressure surface 64, which presses an inserted second belt end 65 having the toothing 90 onto the second lock plate 55 having its toothing 60. In the direction of pull of the belt 50, a positive engagement of the toothing 90 of the belt 50 with the toothing 60 of the second lock plate 55 is obtained; in this positive engagement, the second belt end 65 is held by the clamping lever 63, which is pivotable about a clamping axis 66 expediently formed by a bearing pin 62. In the locking of the form closure between the toothing 90 of the belt 50 and the toothing 60 of the second lock plate 55 by the clamping lever 63, the application of a clamping force is not absolutely necessary; it is sufficient if the clamping lever 63 prevents lifting of the intermeshing toothings 60 and 90. It can be expedient, however, to exert a predefined clamping force on the belt portion lying between the second lock plate 55 and the clamping lever 63, for example on the second belt end 65.

For the securement of the closed belt lock 52 against an opening force, a locking pin 67, which is inserted from outside into receiving openings (68, 69) in the side arm 59 of the lock carrier 56 and projects through the clamping lever 63, is preferably provided. Hence a positive locking of the clamping lever 63 in the lock carrier 56 is ensured; an unintentional opening of the belt lock 52 and a lifting of the intermeshing toothings between lock plate and belt is avoided.

Figure 9:
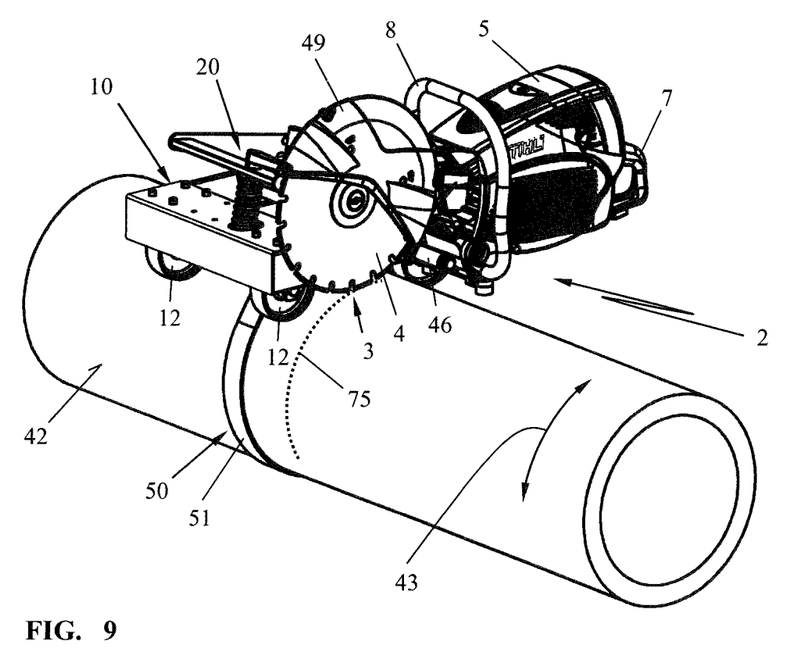
FIG. 9 is a perspective representation of a guide carriage, mounted on the workpiece, with the cutting device.
Figure 10:
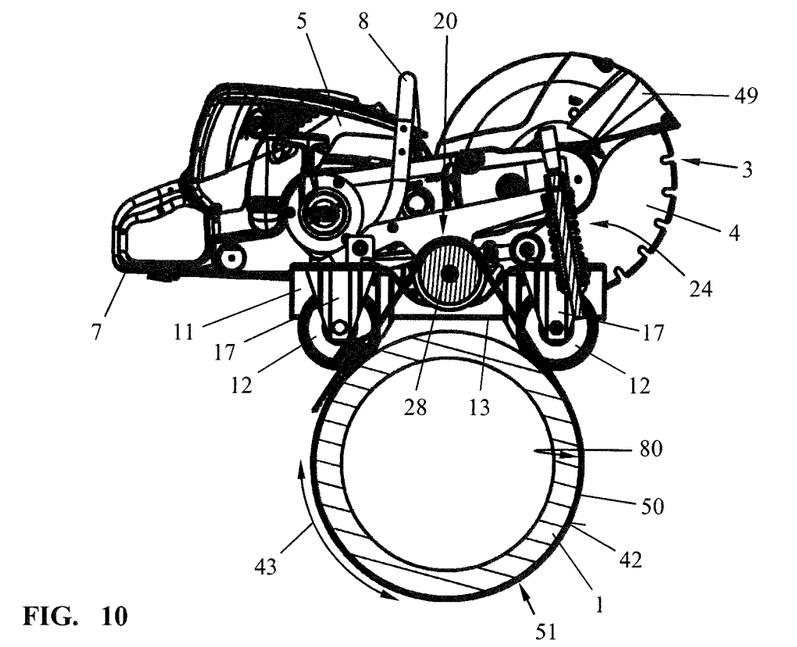
FIG. 10 shows a schematic section through the guide carriage, mounted on a workpiece, according to FIG. 9.

As shown by FIGS. 1 and 9, the belt 50 is mounted in such a way that its toothed belt side 80 lies with the toothing 90 on the workpiece periphery 42. The toothed belt side 80 thus lies also on the periphery of the tension pulley 28; it can be expedient to make the periphery of the tension pulley 28 toothed.

The connecting element 53 can also be configured as a so-called ratchet lock, with which, by ratcheting of a lashing element, the tensioning member 51, in the illustrative embodiment the belt 50, can be mechanically tied down. Expediently, the intermeshing toothings have a profile suitable for mechanical tensioning, which profiles, for the ratcheting, enable sliding of the toothings one over the other, yet in the opposite direction intermesh positively.

The toothings 60 of the lock plates (54, 55) and the toothing 90 of the belt are mutually coordinated so that they intermesh positively. The geometric shape of the toothing can be chosen in accordance with the purpose of use. In the illustrative embodiment, the toothing 90 of the belt 50 runs orthogonally to its longitudinal direction.

It is understood that the foregoing description is that of the preferred embodiments of the invention and that various changes and modifications may be made thereto without departing from the spirit and scope of the invention as defined in the appended claims.

What is claimed is:

1. A guide carriage for a cutting device for cutting a cylindrical workpiece defining a periphery and a peripheral direction, the guide carriage comprising:

a tool carrier for the cutting device;

a tensioning member configured to encircle the workpiece;

a tensioning element;

said tensioning member being guided over said tensioning element;

a tensioning device configured to act on said tensioning element;

a chassis;

said tensioning device being arranged on said chassis;

said tensioning device being configured to act on said tensioning member via said tensioning element and to non-displaceably fix said tensioning member on the periphery of the workpiece;

said chassis being movable along said tensioning member in the peripheral direction of the work piece;

said tension member being a belt having a first belt end and a second belt end;

a connecting element disposed on said belt and configured to close said belt;

said connecting element defining a region of said connecting element configured to block said guide carriage from being moved thereover; and, said tool carrier being configured to enable a mounting of the cutting device in a first working position and alternatively a second working position.

2. The guide carriage of claim 1, wherein:

the cutting device defines a vertical axis; and, said second working position of the cutting device corresponds to said first working position of the cutting device rotated by 180° about said vertical axis.

3. The guide carriage of claim 2, wherein:

the cutting device includes a cutting tool;

said cutting tool and the guide carriage conjointly define a first distance (v) therebetween in said first working position and a second distance (w) therebetween in said second working position; and, said first distance (v) and said second distance (w) are equal.

4. The guide carriage of claim 1, wherein said tensioning member is a toothed belt having a toothed belt side configured to face the periphery of the workpiece.

5. The guide carriage of claim 1, wherein said tool carrier for the cutting device is disposed on said chassis of the guide carriage.

6. The guide carriage of claim 1, wherein said tensioning device includes a bearing shaft;

said tensioning element is a tension pulley held on said bearing shaft; and, said tension pulley has a pulley tensioning position in which said tension pulley has force applied thereto.

7. The guide carriage of claim 6, wherein:

said chassis includes a frame; and, said bearing shaft protrudes beyond said frame of said chassis and forms said tool carrier.

8. The guide carriage of claim 6 further comprising:

a compression member;

said tensioning device including a rocker having rocker arms;

said bearing shaft being held between said rocker arms; and, said compression member being configured to apply a force to said rocker in a tensioning position.

9. The guide carriage of claim 8, wherein said compression member is a spring.

10. The guide carriage of claim 8, wherein:

said compression member has a first end configured to act on said rocker;

said rocker defines a pivot axis; and, said tension pulley is disposed between said first end and said pivot axis.

11. The guide carriage of claim 8 further comprising:

a control element configured to enable a withdrawal of the tensioning force of said compression member so as to de-tension said tensioning device.

12. The guide carriage of claim 1, wherein said connecting element is a belt fastener.

13. The guide carriage of claim 12, wherein:

said belt fastener includes a fastener carrier, a clamping lever, a first fastener plate and a second fastener plate;

said first and said second fastener plates are fixed to said fastener carrier;

said first fastener plate and said fastener carrier are configured to conjointly fix said first belt end therebetween;

said second fastener plate and said clamping lever are configured to conjointly fix said second belt end therebetween.

14. The guide carriage of claim 13, wherein:

said clamping lever is pivotably held on said fastener carrier;

said clamping lever defines a released position and a clamped position; and, said clamping lever is configured to release said belt in said released position and to fix said belt in said belt fastener in said clamped position.

15. The guide carriage of claim 13, wherein said belt fastener is configured to hold said first belt end and said second belt end in said belt fastener in a formfitting manner.

* * * * *